(12) United States Patent
Oswald

(10) Patent No.: US 6,698,321 B2
(45) Date of Patent: Mar. 2, 2004

(54) PIPE SHAVER

(76) Inventor: Fritz Oswald, 470 Main Street, Grimsby, ON (CA), L3M 1T3

( * ) Notice: Subject to any disclaimer, the term of this patent is extended or adjusted under 35 U.S.C. 154(b) by 0 days.

(21) Appl. No.: 10/086,559

(22) Filed: Mar. 4, 2002

(65) Prior Publication Data

US 2002/0129684 A1 Sep. 19, 2002

Related U.S. Application Data

(60) Provisional application No. 60/275,511, filed on Mar. 14, 2001, and provisional application No. 60/330,531, filed on Oct. 24, 2001.

(51) Int. Cl.$^7$ .............................. B23B 5/16; B23B 3/00
(52) U.S. Cl. ........................................... 82/113; 82/128
(58) Field of Search ....................... 82/4, 113; 408/211; 30/95, 96; 15/104.04, 111, 236.01, 236.07

(56) References Cited

U.S. PATENT DOCUMENTS

| | | | |
|---|---|---|---|
| 3,075,219 A | | 1/1963 | Ott .......................... 15/104.04 |
| 3,171,309 A | | 3/1965 | Cloutier ............................ 82/4 |
| 3,361,017 A | * | 1/1968 | Baumgarten ................. 82/128 |
| 3,636,803 A | * | 1/1972 | Miller .......................... 82/113 |
| 3,817,649 A | | 6/1974 | Medney ....................... 408/211 |
| 4,691,600 A | | 9/1987 | Carlson et al. .................... 82/4 |
| 4,744,123 A | * | 5/1988 | Le Testu et al. .......... 15/104.04 |
| 5,600,862 A | * | 2/1997 | Bleske et al. ............. 15/104.04 |
| D425,084 S | | 5/2000 | Schreck ........................ 15/138 |
| 6,434,776 B1 | * | 8/2002 | Pfeiffer et al. ........... 15/104.04 |

* cited by examiner

*Primary Examiner*—A. L. Wellington
*Assistant Examiner*—Dana Ross

(57) ABSTRACT

The present invention a pipe shaver a pipe shaver for removing a uniform layer of material from the outer diameter of a pipe, the pipe shaving includes a housing including a longitudinal axis; a cutting blade including a blade guide for positioning a front face of said cutting blade at an angle theta of not less than 95 degrees relative to the pipe surface and for mounting said blade to said housing, said blade including a cutting edge; a lifting means for manually urging said blade radially outwardly away from said pipe and inwardly to the outer diameter of the pipe; and a lever for manually urging said blade radially outwardly away from said pipe and a threaded cam for moving said cutting edge longitudinally along the outer diameter of said pipe for shaving a thin substantially uniform layer of material off the outer diameter of the pipe.

11 Claims, 9 Drawing Sheets

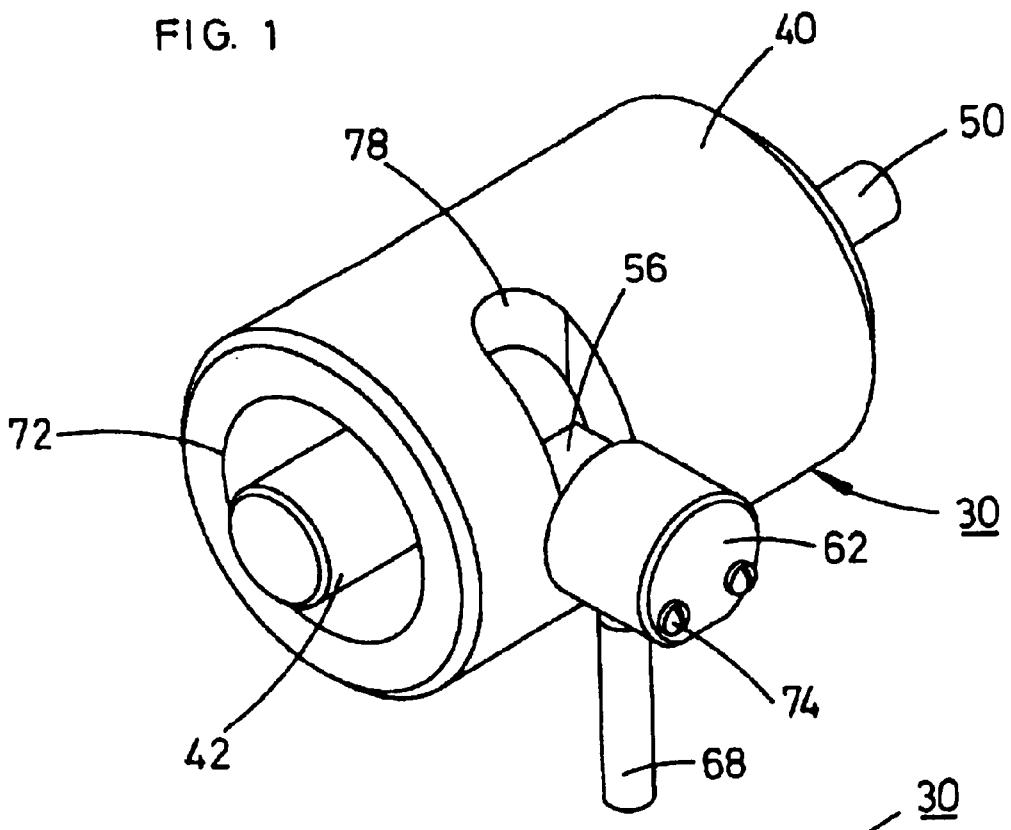
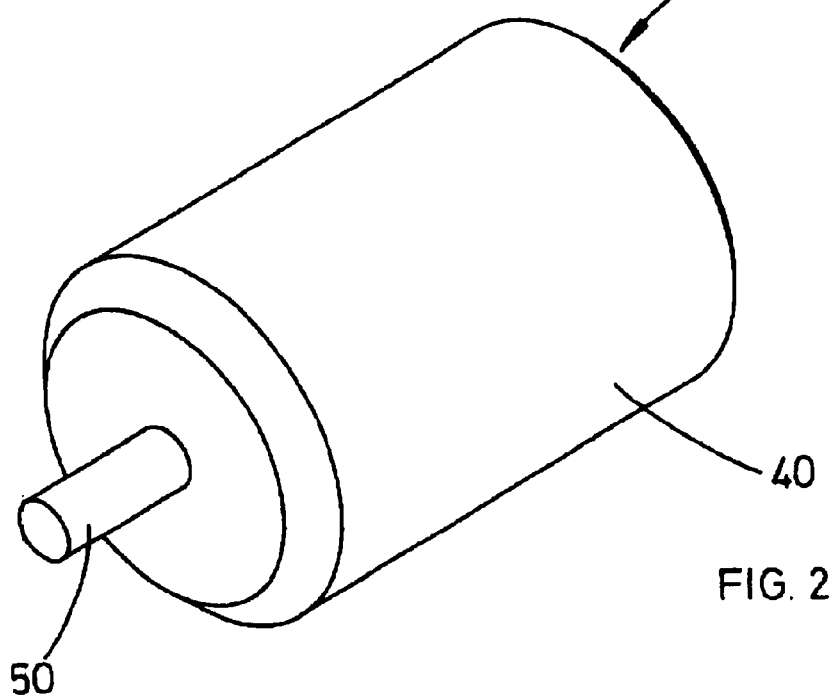

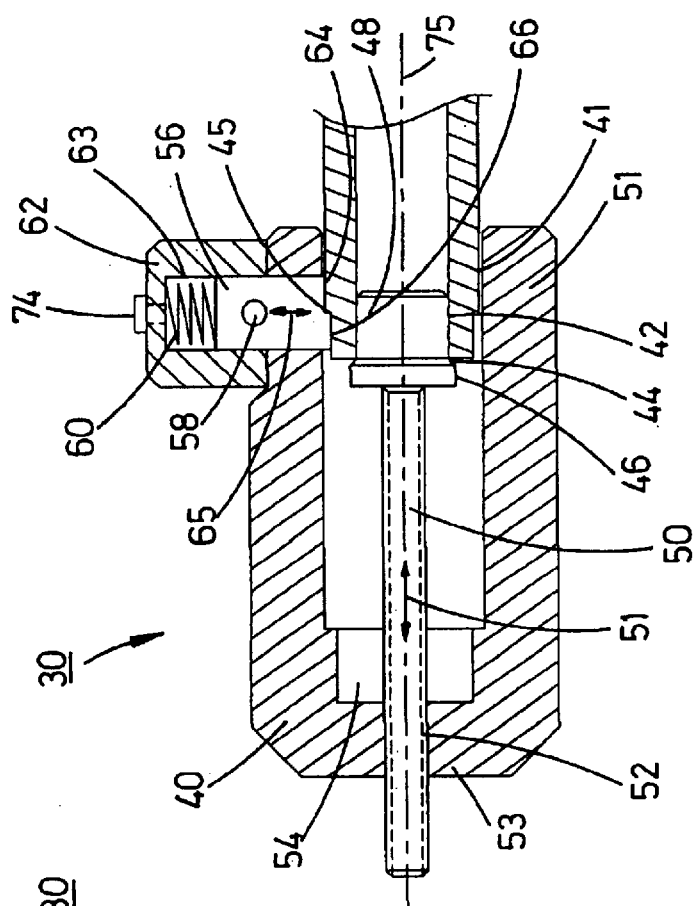
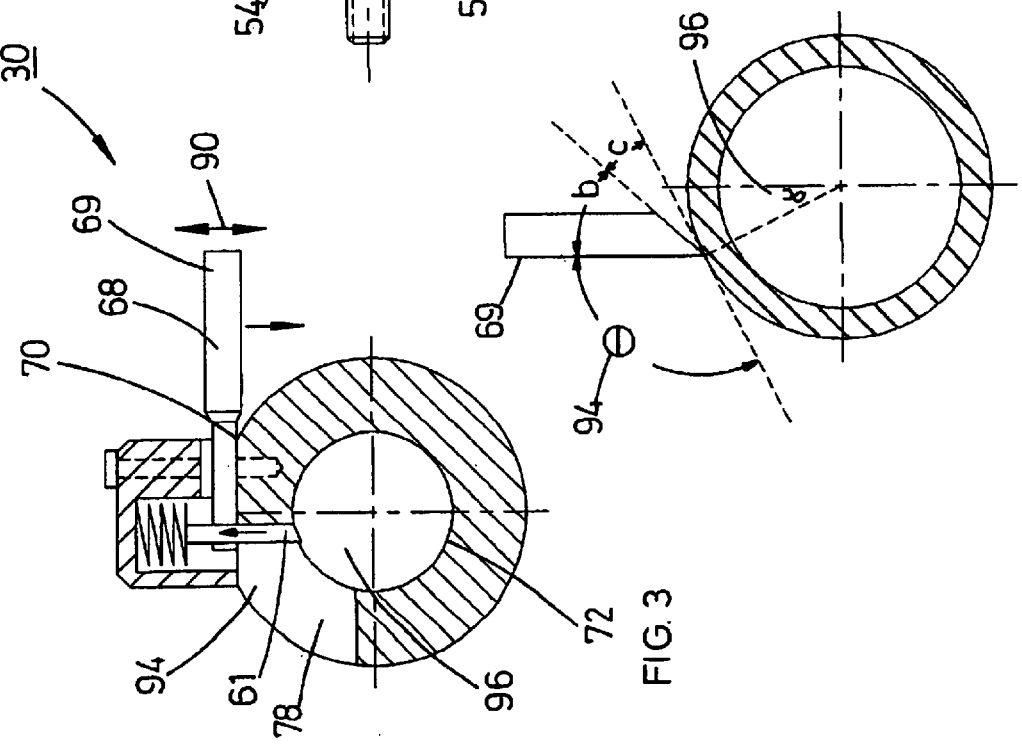
FIG. 4
FIG. 5
FIG. 3

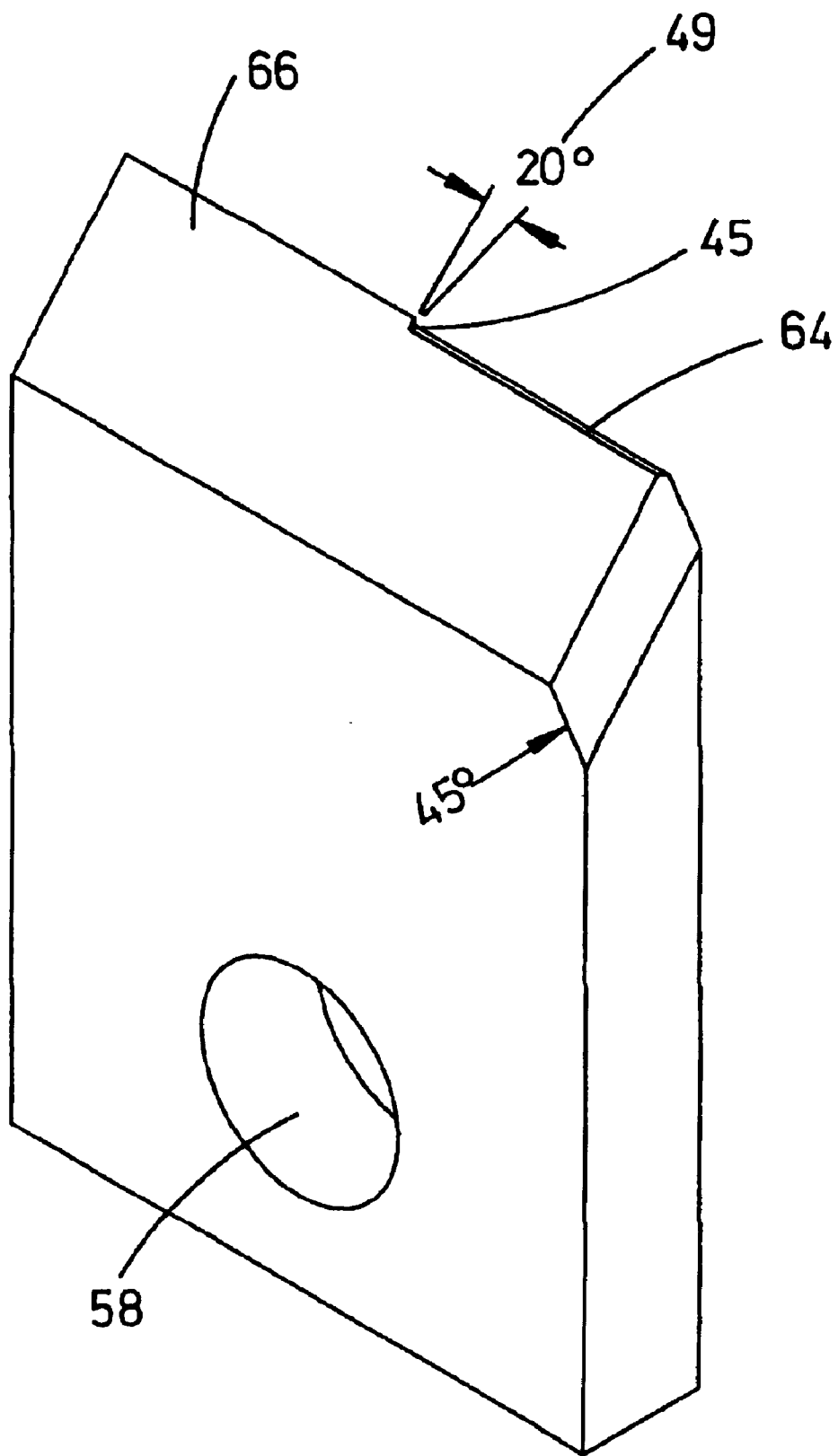

FIG. 11
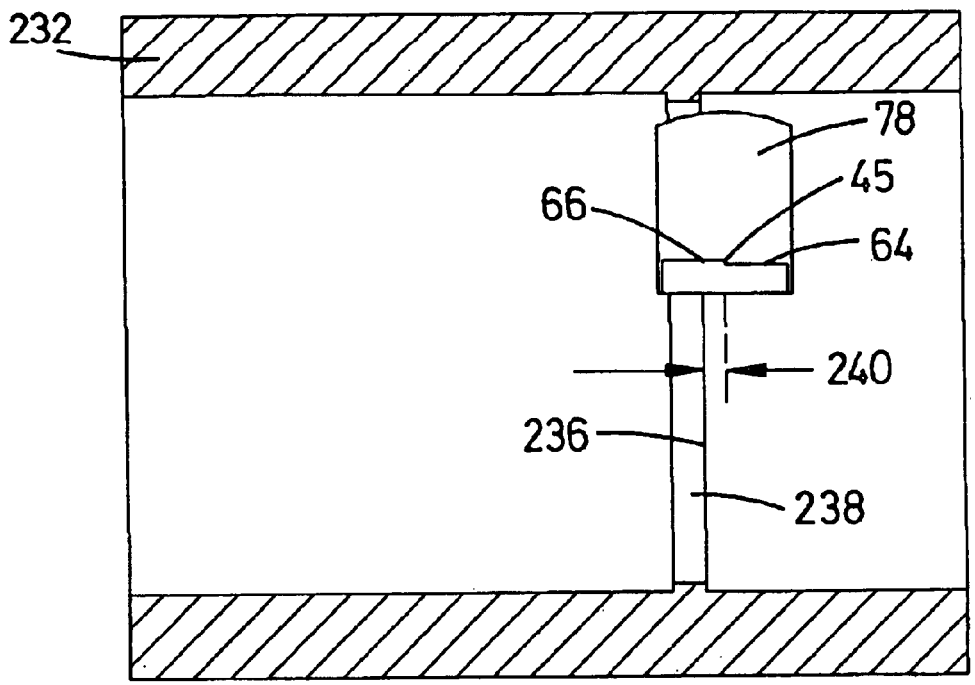
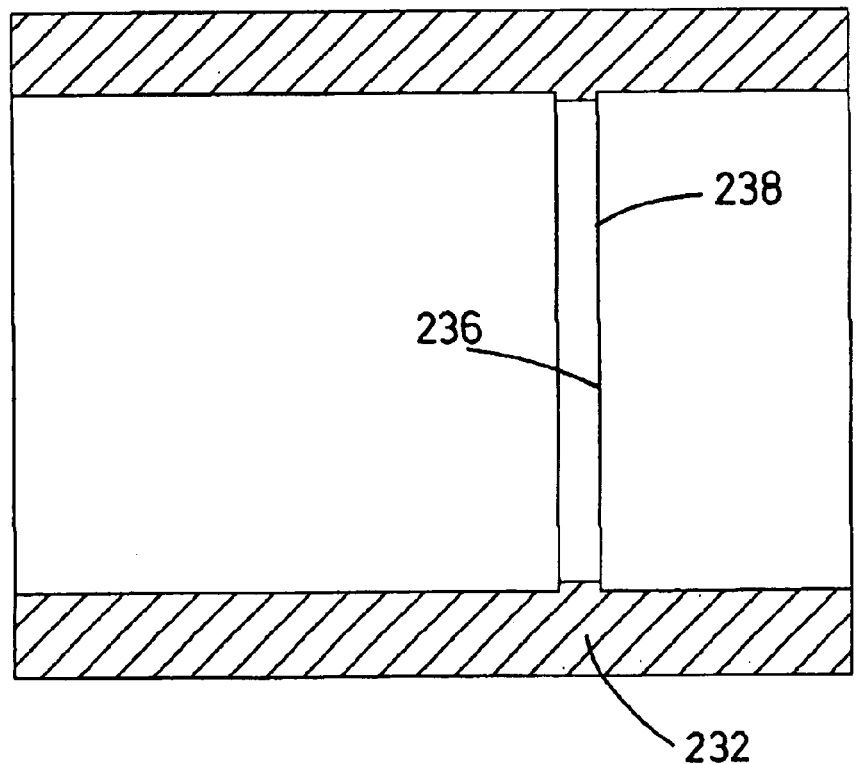
FIG. 12

PIPE SHAVER

This application claims benefit of Provisional Appln. No. 60/275,511 filed Mar. 14, 2001 and Provisional 60/330,531 filed Oct. 24, 2001.

FIELD OF THE INVENTION

The invention relates generally to devices used for preparing pipe end surfaces for welding of sleeves thereon and more specifically relates to devices used for shaving a portion of the outer diameter of the end of a pipe for preparation of welding.

BACKGROUND OF THE INVENTION

Currently, the most popular way of transmitting natural gas is by the use of plastic pipes which are generally made of polyethylene, polyvinyl chloride or other types of plastic. These pipes are interconnected end to end by welding sleeves onto the ends of these pipes which in turn is welding onto the next length of pipe to be connected. The surfaces of the end of the pipe must be prepared to remove any trace of dirt and/or oxidation on the pipes so that a connecting sleeve can be effectively welded onto the end of a pipe. In order to remove the oxidized layer, currently the end of the pipe is prepared by either scraping manually using a sharp scraper blade and/or sanding using fine grit sand paper or in some instances, abrasive powder is used in order to abrade the end surface thereby removing the oxidized layer and any dirt thereon. Unfortunately, the effectiveness of these methods and the repeatability of obtaining a good clean oxide free surface prior to welding of a connecting sleeve onto the end of the pipe has been rather poor. The quality of the surface preparation is depended upon how effective the operator is in scraping the surface and/or applying the sand paper or the abrasive grit, the length of time that the cleaning has taken place and the skill of the operator in preparing the surface. This leads to quality control issues in regard to the repeatability in preparing a good clean oxide free surface for welding of connecting sleeves onto the ends of plastic pipes.

Those skilled in the art are aware that leaks in natural gas pipe lines cannot be tolerated and can lead to disastrous consequences. Therefore, it is imperative that an oxide free clean surface is prepared in a consistent and repeatable manner so that a high degree of quality control can be exercised when welding connecting sleeves to the end of pipes.

A number of devices have been patented as follows:

U.S. Pat. No. 3,075,219 by J. V. Ott, patented Jan. 29, 1963, titled Pipe Cleaning Tool, describes a tool having a scraping blade which can be adjusted to accommodate various sizes of pipes.

U.S. Pat. No. 3,171,309 by A. J. Cloutier, patented Mar. 2, 1965, titled Device for Turning Male Ends on a Pipe, describes a device for use in forming male ends on tubular members.

U.S. Pat. No. 4,691,600 by Larry Carlson et al, patented Sep. 8, 1987, titled Pipe Shaver, describes a device having an elongated mandrel and a plurality of cutting tools used to shave the outer surface of a predetermined length of pipe.

Finally, U.S. Pat. No. 3,817,649 by Medney, patented Jun. 18, 1974, titled Pipe Scarfing Tool, describes a tool having a rotatable housing with a plurality of cutting blades therein which are rotated thereby scarfing and/or scraping the outside diameter of a pipe.

The disadvantage of all the above-mentioned devices is that they are unable to absorb any of the pipes extra thick portions or defective ovalization or out of roundness of the pipe. In other words, these devices do not make it possible to lift off a shaving or a very small portion of the out diameter thickness of the pipe regardless of the pipes deformations which include ovalization, thickness variations and/or outer deflections.

Finally, U.S. Pat. No. 4,744,123 by Le Testu et al, patented May 17, 1988 titled Device for Scraping the Outer Surface of a Tube, describes a device for shaving material from the outer surface of a pipe which is able to absorb defective ovalizations and/or variations in wall thickness and/or pipe deflections.

Unfortunately, in practise this device is unable to remove a very thin consistent showing in a uniform manner around the outer diameter of a pipe regardless of the deformities and/or ovalizations in the pipe. As well due to the complicated mechanical construction of the device it is difficult and time consuming to use and prone to mechanical breakdowns in the field. This device is more suitable for larger diameter pipes generally greater than 4 inches in diameter.

Therefore there is demand for device in the field which will quickly and easily shave off less than 10% of the wall thickness of the outer diameter of a pipe, near the pipe end for preparation for welding a connecting sleeve thereto which will provide a very uniform clean surface in a reproducible manner at low costs and highest reliability.

SUMMARY OF THE INVENTION

The present invention a pipe shaver for removing a uniform layer of material from the outer diameter of a pipe, the pipe shaving comprises;

(a) a housing including a longitudinal axis;
(b) a cutting blade including a mounting means for mounting said blade to said housing, said blade including a cutting edge;
(c) a means for removably presenting said cutting edge to the out diameter of the pipe; and
(d) a means for moving said cutting edge around longitudinal axis along the outer diameter of said pipe for shaving a thin layer off the outer diameter of the pipe.

Preferably wherein said mounting means includes a blade guide for positioning a front face of said cutting blade at an angle theta of not less than 95 degrees relative to the pipe surface.

Preferably wherein said mounting means includes a blade guide for positioning a front face of said cutting blade at an angle theta not less than 114 degrees and not more than 120 degrees.

Preferably, wherein said mounting means includes a blade guide for positioning a front face of said cutting blade off set from said longitudinal axis at a blade position delta not equal to 0 degrees.

Preferably wherein said mounting means includes a blade guide for positioning a front face of said cutting blade off set from said longitudinal axis at a blade position delta>5 degrees.

Preferably wherein said presenting means includes a means for normally biasing said blade radially inwardly onto the out diameter of a pipe.

Preferably, wherein said presenting means includes a lifting means for manually urging said blade radially outwardly away from said pipe.

Preferably, wherein said presenting means includes a blade housing for slidably receiving said blade therein, such that said blade moves up and down slidably in the radial direction.

Preferably, wherein said blade housing adapted to receive said housing means therein for biasing said blade radially inwardly.

Preferably, wherein said lifting means includes a pivoting lever connected at one end to said cutting blade, the other end projecting from said housing, such that pivoting said lever about a pivot point biases and lowers said cutting blade in a radial direction.

BRIEF DESCRIPTION OF THE DRAWINGS

The present invention will now be described by way of example only with reference to the following drawings in which:

FIG. 1 is a schematic front perspective view of the pipe shaver.

FIG. 2 is a schematic rear perspective view of the pipe shaver.

FIG. 3 is a schematic cross-sectional view of the pipe shaver taken radially through the blade housing.

FIG. 4 is a schematic cross-sectional view taken longitudinally through the threaded shaft of the pipe shaver.

FIG. 5 is a schematic cross-sectional view of cutting blade geometry with a gas pipe.

FIG. 6 is a schematic view of the cutting blade.

FIG. 11 is a schematic cross-sectional view of the pipe shaver taken radially through the blade housing.

FIG. 12 is a schematic cross-sectional view of the pipe.

DETAILED DESCRIPTION OF THE PREFERRED EMBODIMENT

Figure 7:
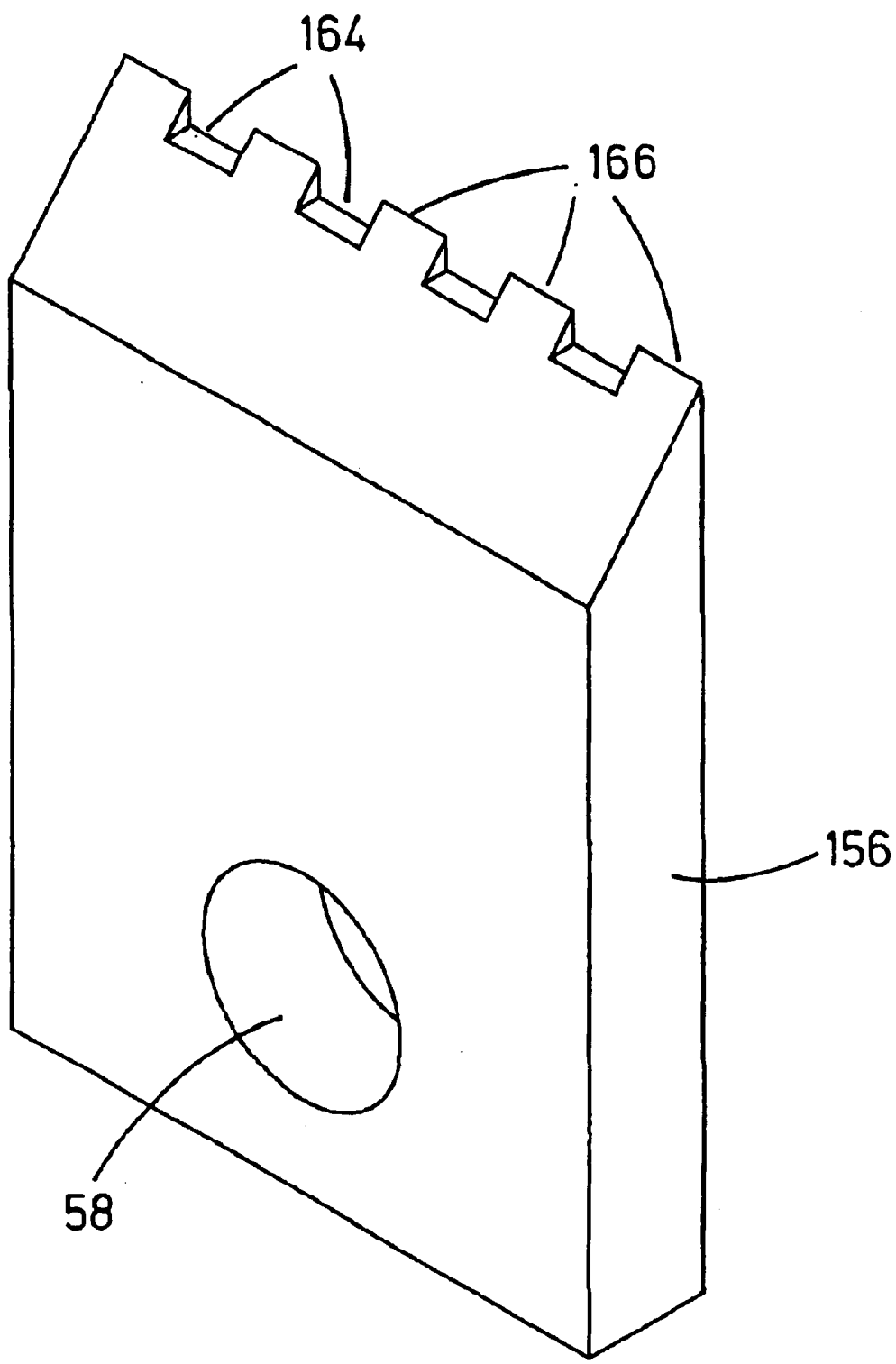
FIG. 7 is a schematic view of the cutting blade.

Referring to FIGS. 1, 2, 3 and 4 the present invention a pipe shaver shown generally as 30 includes the following components: a cylindrical body 40 having mounted therein a threaded shaft 50 which was mounted on one end thereon a mandrel 42. Cylindrical body 40 further includes a blade housing 62 having a cutting blade 56 mounted therein for engagement with a pipe 41.

Cylindrical body 40 generally has a cylindrical shape with a pipe receiving aperture 72 in the front portion 51 of cylindrical body 40. The rear portion 53 of body 40 is generally closed off having defined therein a threaded aperture 52.

Threaded aperture 52 co-operates with threaded shaft 50 such that when threaded shaft 50 is rotated about longitudinal axis 75, it threadably engages with threaded aperture 52 thereby longitudinally moving inwardly or outwardly along direction 51.

One end of threaded shaft 50 has mounted proximate one end a mandrel 42. Mandrel 42 includes a pipe receiving section 48, a shoulder 44 and an upper section 46. In this manner the inside diameter of plastic pipe 41 to be shaved with pipe 41 is dimensioned so as to snugly slidably receive the inside diameter of the plastic pipe onto pipe receiving section 48.

Blade housing 62 defines a blade channel 63 which is dimensioned to slidably receive therein the cutting blade 56. Cutting blade 56 slidably moves within blade channel 63 in an upwardly or downwardly radial direction shown as 65. It is normally biased downwardly by spring 60 which urges cutting blade 56 downwardly towards mandrel 42.

Cutting blade 56, furthermore is carefully designed to include a blade guide portion 64 and a cutting edge 66 along the longitudinal face of cutting blade 56 as shown best in FIG. 6. Cutting blade 56 furthermore includes a front face 69, a lever aperture 58 which receives there through one end of lever 68 which when moved upwardly or downwardly, shown as motion 90, urges cutting blade 56 upwardly and downwardly along radial direction 65. As already mentioned, spring 60 normally biases cutting blade 56 downwardly towards mandrel 42, however by pushing downwardly on lever end 69, lever 68 pivots on a portion of body 40, namely pivot point 70, thereby lifting cutting blade 56 along radial direction 65, and off of pipe 41.

Cutting blade 56 is housed within blade housing 62 and also is slidably received along blade guide 61 which is a portion of body 40.

The positioning of cutting blade 56 is carefully selected to provide a cutting angle theta shown as 94 which can be as little as 95 degrees and as much as 125 degrees but preferably is between 114 degrees and 120 degrees and preferably is found to work best at approximately 117 degrees. Angle theta 94 is angled between front face 69 and a tangent to the pipe at the point of contact of the cutting edge 66, as shown in FIG. 5. In order to obtain the necessary cutting angle theta, the cutting blade 56 is positioned at a blade position delta shown as 96. In other words, cutting blade 56 is mounted offset from the centre line or longitudinal axis 75 of housing 40.

Persons skilled in the art will recognize the same cutting angle can be obtained by mounting the blade at the desired angle by noting the blade itself.

A person skilled in the art will realize that a blade position when delta 96 is 0 degrees, corresponds to a cutting angle theta shown as 94 of 90 degrees or normal to the working surface. It is also apparent that as blade position angle delta shown as 96 increases, the cutting angle theta shown as 94 will also increase. In other words theta 94 and delta 96 are interrelated to each other. The inventor has found that there is an optimum position for cutting blade 56 to produce a very fine continuous shaving off the outside diameter of a pipe preventing chattering or rubbing of cutting blade 56.

Cutting blade 56 also includes a step 45 having a relief 49 of about 20 degrees.

Use of Pipe Shaver

Pipe shaver 30 is preferably utilized as follows. Currently for the transmission of natural gas, the preferred material is polyethylene piping having a wall thickness of approximately 4 mm. In order to join one length of pipe to another, an electro fusion process takes place wherein a connecting sleeve is electro fused to one end of the pipe which in turn is then fused to the other length of pipe to be attached and further laid. In order to ensure a complete electro fusion of the connecting sleeve to the plastic pipe, a consistent precise removal of the oxidation layer of the pipe must first take place. It is also important to note that approximately 10% of the wall thickness is the maximum amount that one can safely remove without weakening the integrity of the pipe substantially. Therefore for a pipe having a 4 mm wall thickness, the largest amount of material than can be removed is 0.4 mm in total, however in practise, no more than 75% of that amount is removed in order to provide for some factor of safety. Therefore, in practise, no more than 0.3 mm is removed off the wall thickness. Therefore, the device for preparation for electro fusion must consistently remove approximately 0.3 mm of material as it shaves the outer surface of the plastic pipe. Note that the amount removed is about 5% of 7.5% of the wall thickness depending upon the pipe dimensions.

In order to accomplish this, the inner diameter of a plastic pipe is snugly mounted onto pipe 41 receiving section 48 such that rotation of the pipe in turn will rotate mandrel 42 and in turn rotate threaded shaft 50. Pipe 41 is mounted onto pipe receiving section 48 until it engages with shoulder 44 thereby determining the amount of pipe received onto mandrel 42. Shoulder 44 acts as a stop preventing pipe 41 from sliding onto upper section 46 of mandrel 42. With pipe 41 fitted over pipe receiving section 48, blade guide 64 makes contact with the outer diameter of the pipe. Blade guide 64 has a dull rounded surface and is not designed to cut and/or scrap the outer surface diameter of the pipe.

Cutting blade 56 further has a cutting edge 66 which is separated by a step 45 between blade guide 64 and cutting edge 66. The height of step 45 will be the depth of cut one requires into the plastic pipe, namely about 0.3 mm in the case of a pipe having a 4 mm wall thickness.

In order to initiate shaving of the outer diameter of the pipe, either pipe 41 can be rotated or body 40 can be rotated such that mandrel 42 threadably screws threaded shaft 50 into threaded aperture 52 of body 40 thereby moving pipe longitudinally along longitudinal direction 51 thereby engaging pipe 41 with cutting edge 66.

Alternatively, cutting blade 56 can be lifted off of pipe 41 in the radial direction 65 away from mandrel 42, thereby making it easier to slide pipe onto pipe receiving section 48. Once the pipe is mounted onto pipe receiving section 48, lever 68 can be released thereby bringing cutting blade 56 into contact with the outer diameter of the pipe 41 mounted on pipe receiving section 48.

As already stated, shaving the end of the pipe commences by turning body 40, relative to pipe 41 mounted pipe receiving section 48. This brings pipe 41 into contact with cutting edge 66 which will remove a shaving off the surface of the pipe and the pipe will advance longitudinally along longitudinal direction 51 depending upon the thread selected for threaded shaft 50. As cutting takes place, blade guide 64 maintains contact on the original non-cut oxidized surface thereby maintaining an accurate depth of cut of cutting edge 66. It will be apparent to those skilled in the art that the size of step 45 to great extent determines the depth of cutting and depending upon the size of step 45 selected, shallow or deeper cuts can be removed from the wall thickness of the pipe. Approximately 5% of 7.5% of the wall thickness of the pipe is removed. Using this technique a very thin continuous shaving is taken off of the outer diameter of the pipe 41.

Once the pipe has advanced along cutting blade 56 to a predetermined distance upper section 46 makes contact with stop 54 located at the end of body 40 thereby preventing further threading of threaded shaft 50 into threaded aperture 52. At this point the shaving of the outside diameter of the pipe has been completed.

Typically a shaving extending approximately 2 inches along the outer diameter of the pipe nearest to the pipe end is removed in order to place a connecting sleave over that section for electro fusion.

In order to prevent cutting blade 56 from gouging or placing a groove into the freshly shaved outer diameter of pipe as it is removed away from body 40, lever 68 is depressed at lever end 69 thereby pivoting lever about pivot point 70 and raising cutting blade 56 in a radial direction 65 away and off of the pipe thereby preventing any grooving or gouging of freshly shaved surface of pipe 41 as it is removed from the pipe shaver 30.

Those skilled in the art will realize that cutting blade 56 is resiliently biased against the outside diameter of the pipe by spring 60 in such a manner that cutting blade 56 floats along the top surface of the pipe that is being cut, thereby conforming to any irregularities, ovalness or differences in thicknesses of the wall thickness of the pipe by floating across the surface of the pipe through the resiliently biasing action of spring 60. Furthermore, the reader will note that a uniform cut of depth is always accomplished by selecting a predetermined size of step 45 in cutting blade 56 such that blade guide 64 maintains cutting edge 66 at a predetermined depth into the wall thickness of the pipe.

Furthermore, a cutting angle theta shown as 94 is selected to provide the smoothest possible cut and shaving without chattering or grabbing of cutting blade 56 as the turning occurs.

Body 40 has been designed and is intended to be turned manually by hand around the outside diameter of the pipe, but just as easily the pipe could be turned and body 40 could be kept stationary. The present concept will work as long as there is relative rotational motion between body 40 and the pipe 41.

Further a view slot 78 is provided such that the operator can view the cutting action of cutting blade 56 as body 40 is rotated manually.

There is no reason why body 40 could not be attached to a mechanical drive system and/or other mechanism which could automatically or mechanically rotate body 40 relative to pipe mounted on pipe receiving section 48.

Furthermore, it will be apparent to those skilled in the art that a cylindrical body shape 40 has been selected in order provide for maximum rigidity of body 40 so that cutting blade 56 resting against blade guide 61 of body 40 has the maximum rigidity possible when cutting is taking place.

In order to achieve a smooth reliable cut, a rigid blade guide 61 is provided to maintain cutting blade 56 in a precise orientation with pipe 41.

It is also possible to use this device for removing material from pipes made of material other than plastic for example copper, aluminum, steel or other materials. Pipe shaver 30 can also be used to cut threads into pipes or for scoring or scarfing pipe surfaces, however the preferred application is for shaving off a thin layer of the outer diameter of plastic pipes.

Alternate Cutting Blade Geometry

Referring now to FIG. 7, showing an alternate cutting blade 156 which includes cutting edges 156 separated by relief portions 154 as shown in FIG. 7. Cutting blade 156 is dimensioned similarly to blade 56 to be received within blade channel 63, then along blade guide 61 as shown in previous FIGS. 3 and 4. The major difference between cutting blade 156 shown in FIGS. 7 and 56 shown in FIG. 6 is the cutting edge arrangement, wherein cutting edges 166 are spaced apart in regular intervals having there between relief portions 164, such that when cutting blade 156 is presented to a pipe 41, it would cut through into the outside diameter of pipe 41, the grooves having the width of cutting edges 166 as shown in FIG. 7.

Cutting blade 156 is used in situations wherein rather than shaving off a thin portion of the outside diameter of pipe 41, instead it is required that grooves be cut into the outside diameter of the pipe which is quite often the case with copper pipes rather than with plastic pipes. When using cutting blade 156, the end of a pipe is placed on mandrel as previously described, however, the pipe is so positioned on the mandrel which is also positioned in such a manner that the end of the pipe corresponds with the width of cutting blade 156. In this manner all 5 cutting edges 166 as shown in FIG. 7 are simultaneously presented to the outside surface of pipe 41. Pipe shaver 30 is modified such that threaded shaft 50 does not advance longitudinal to direction 51 as it is rotated, but rather threaded shaft 50 is simply allowed to rotate without moving longitudinally along the longitudinal direction thereby simply rotating pipe 41 about its axis. In this manner uniform grooves corresponding to cutting edges 166 are cut into the outside diameter of pipe 41 and once these grooves are cut, cutting blade 56 is lifted off the surface of pipe 41 by using a pivoting motion 90 on lever end 69 and thereafter pipe 41 can be removed from pipe shaver 30 leaving 6 uniformed grooves cut into the end of pipe 41. Kindly note that cutting blade 156 can have any number of cutting edges, however by way of example only six grooves are depicted in cutting blade 156.

Pipe Shaver Alternate Embodiment

An alternate embodiment to the present invention a pipe shaver shown generally as 230 in FIGS. 8 through 15 inclusively, includes the following major components, split housing 232 which have hingeably mounted with hinges 300, handle 234 projecting from each half of split housing 232, a fastening screw 304 cooperatively engaging with thumb nut 302. In the interior portion a shoulder stop 236 having a stop face 238. The cutting blade assembly as described in FIGS. 1 through 6 is essentially identical with the one used with pipe shaver 230. In particular, pipe shaver 320 includes a cutting blade 56, slidably received within blade housing 62 along blade channel 63 and is resiliently biased with spring 60, wherein cutting blade 56 includes a blade guide portion 64, a cutting edge 66, a step 45, a lever aperture 58 in identical fashion to the cutting blade arrangement shown in FIGS. 3 and 4. Pipe shaver 230 also includes, although not shown, lever 68, pivot point 70 for manually retracting cutting blade 56 away from the outside diameter of a pipe.

The reader will note that pipe shaver 230 does not include a mandrel 42, a threaded shaft 50, a threaded aperture, 52 as in the previous embodiment as described in FIGS. 1 through 6. But rather split housing 232 includes an interior diameter 270 and has open ends on either end for receiving and advancing a pipe 244 there through. Pipe shaver 230 also includes a viewing slot 78 as in the previous embodiment and cutting blade 56 is identical to cutting blade 56 depicted in FIG. 6 and includes the blade guide portion 64, the cutting edge 66 and the step 45.

Use of Pipe Shaver 230

Figure 13:
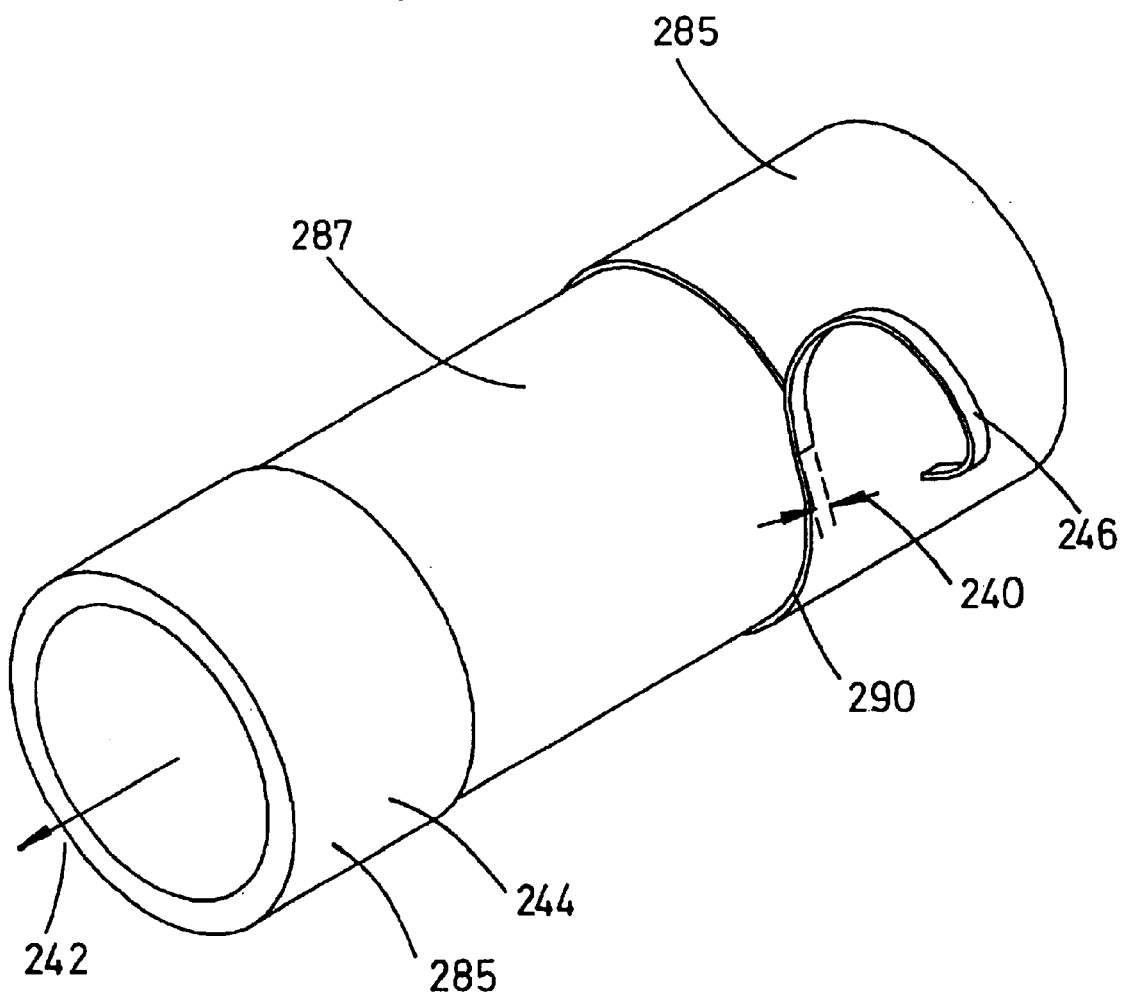
FIG. 13 is a perspective view of a pipe having been shaved.

Referring now to FIG. 8 through 15, pipe shaver 230 is used in circumstances where one wishes to shave off a thin layer from the outside diameter of a pipe 244 shown in FIG. 13 which is already laid in place. The present pipe shave 230 is useful in situations where one wishes to shave off a thin layer off pipe 244 not necessarily at an end but any where along the length of the pipe in order to weld a T-joint in place for example. The reason for shaving off the thin outside portion of pipe 244, again is provide a clean oxide free surface for subsequent welding operations and for attaching various components to the plastic pipe.

Figure 9:
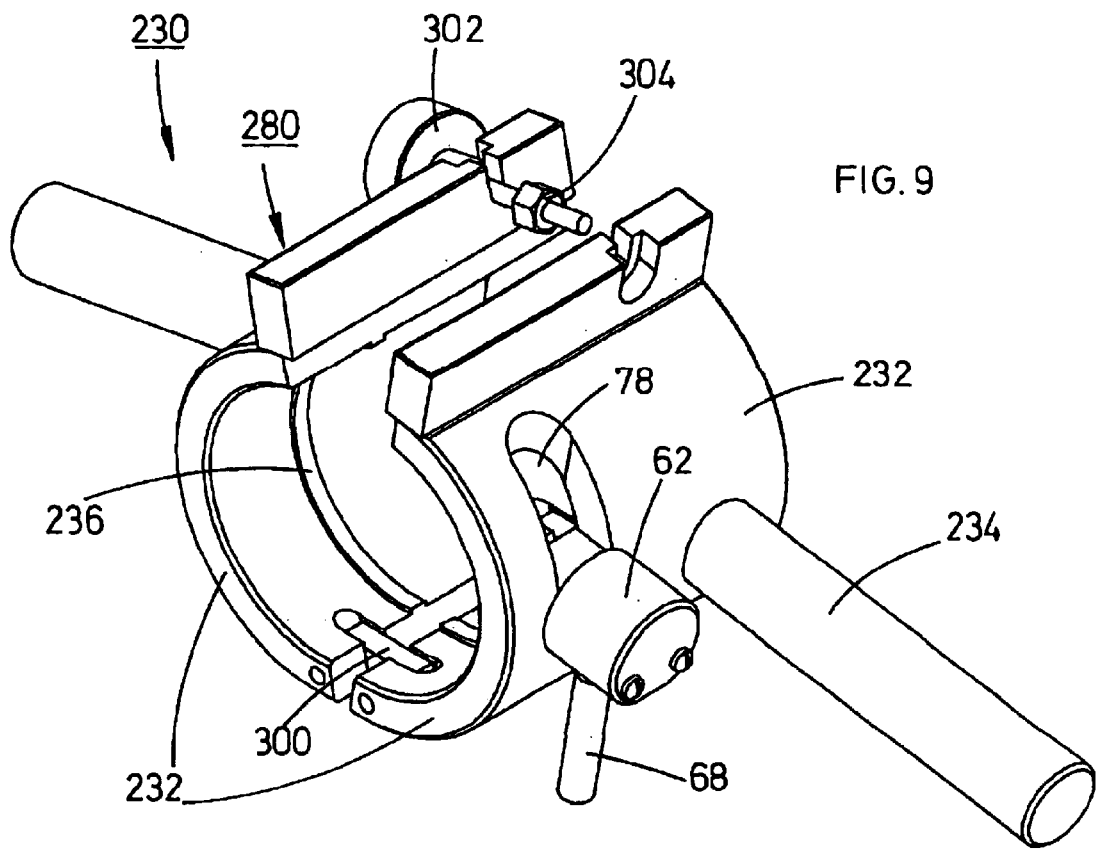
FIG. 9 is a schematic front perspective view of the pipe shaver.

In order to begin pipe shaving, first of all pipe shaver 230 is split open and placed into the open position 280 shown in FIG. 9 and all though not shown totally in FIG. 9, the two halves of split housing 232 can pivot totally open about hinges 300, such that they can be placed around any portion of pipe 244 and at any position along the length of pipe 244.

Once split housing 232 is placed around the outside diameter of pipe 244, the two halves of split housing 232 are brought together and fastened using screw 304 and thumb nut 302 to close the halves of split housing 232 together such that it fits snugly around the outside diameter of pipe 244.

Figure 14:
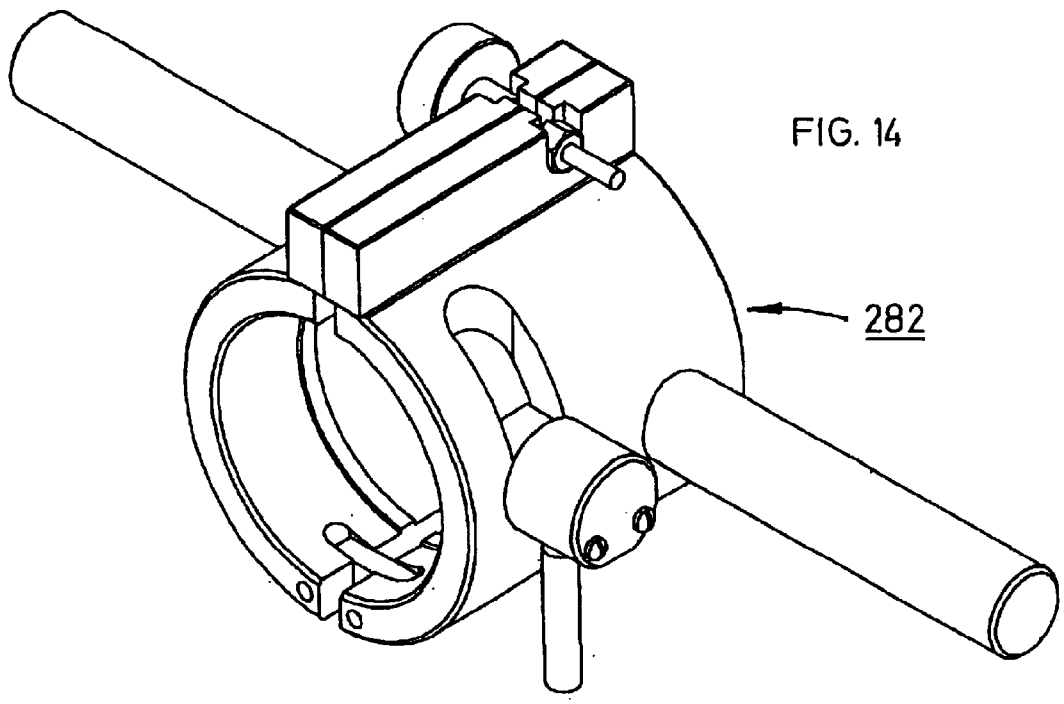
FIG. 14 is a schematic front perspective view of the pipe shaver shown in closed position.
Figure 15:
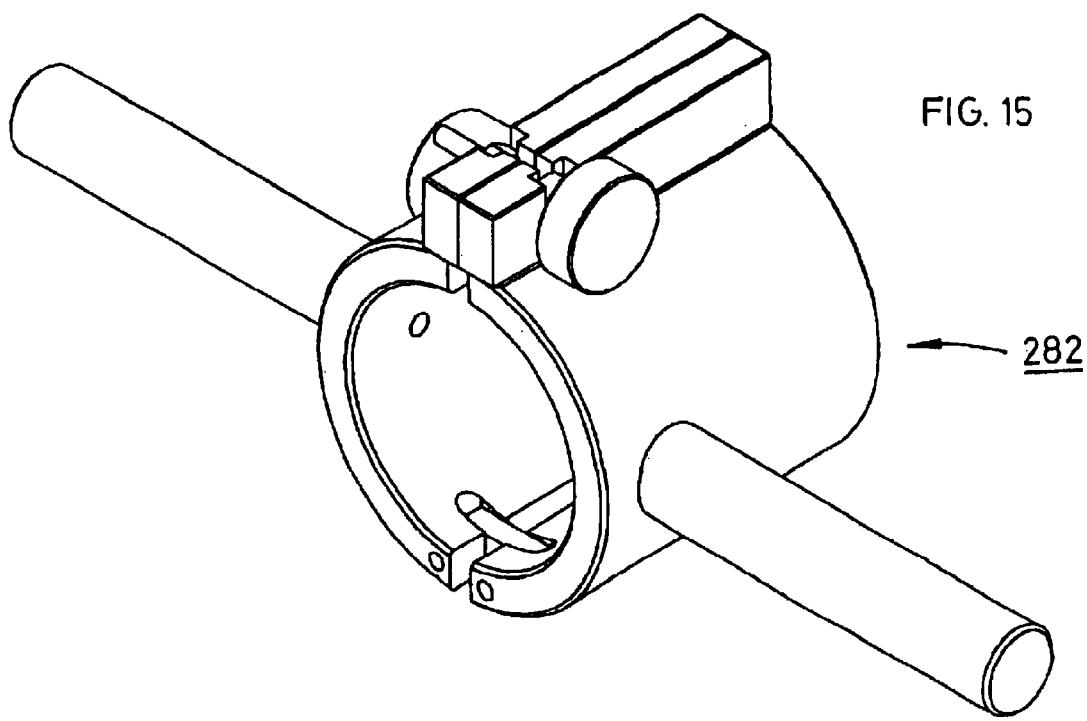
FIG. 15 is a schematic rear perspective view of the pipe shaver.

FIG. 14 shows pipe shaver 230 in the closed position viewing the side of the cutting blade assembly, whereas FIG. 15 also shows pipe shaver 230 in a closed position viewing the other side and the thumb nut 302.

The arrangement shown by which the two split housing 232 are hinged and are fastened together is by way of example and any other technique which is known in mechanical arts for clamping together two split housings 232 as shown in these diagrams and works equally well is acceptable.

Figure 8:
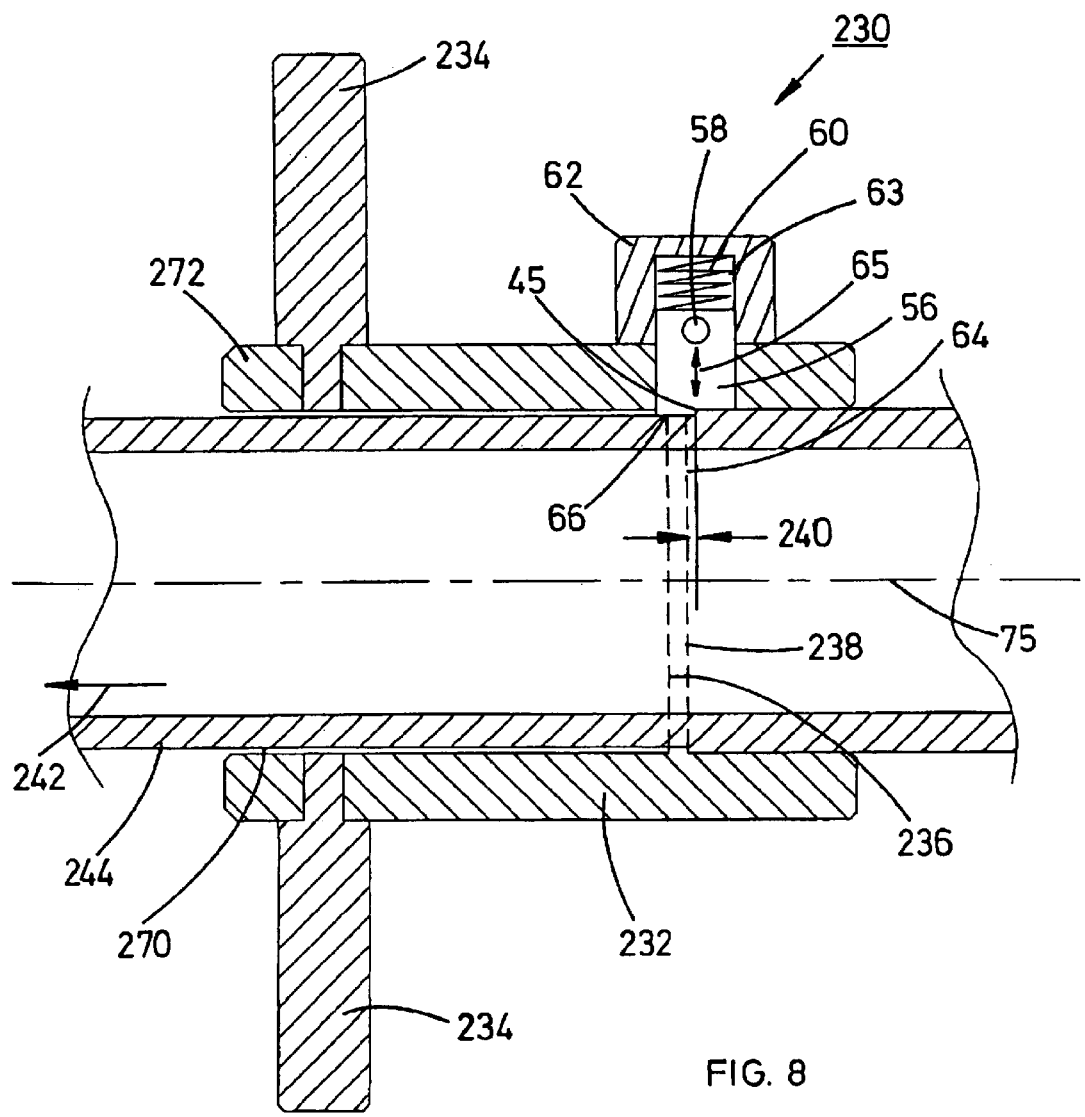
FIG. 8 is a schematic cross-sectional view of the pipe shaver taken radially through the blade housing.

FIG. 8 shows the pipe shaver 230 in cross sectional view with a pipe 244 mounted inside and along the interior diameter 270 of split housing 232. One will note that split housing 232 includes a shoulder stop 236 as shown in FIGS. 8, 10 and as best viewed in FIGS. 11 and 12 which includes a stop face 238 which makes contact with a cut edge 290 of pipe 244 as it is being shaved.

Figure 10:
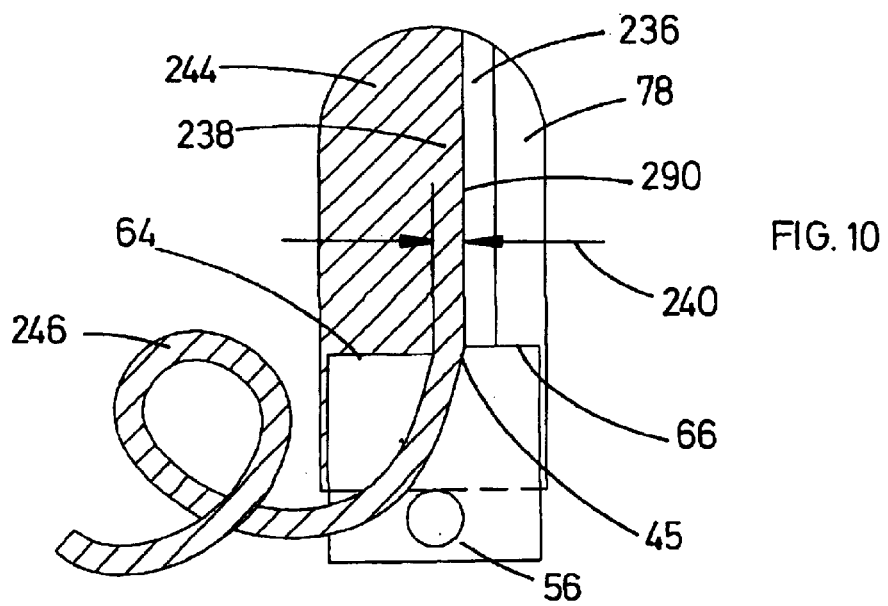
FIG. 10 is a schematic view through viewing slot.

It is critical to note that there is an off set distance shown as W namely cutting width 240 on FIGS. 8, 10 and 11. It is this cutting width 240 which controls the width of shaving 246 as it is peeled off the outside diameter 285 of pipe 244. The width of the cut or the width of the shaving 246 is controlled by this cutting width off set which is the distance between the edge of the stop face 238 and the location of step 45 relative to the longitudinal direction of split housing 232.

In order to effect shaving or peeling of outside diameter 285 of pipe 244, cutting blade 56 which is resiliently biased onto the outside diameter 285 of pipe 244 with spring 60, bites into or cuts into the outside diameter 285 of pipe 244 with cutting edge 66 of cutting blade 56. One must apply manual pressure to pipe 244 in the advancement direction 242, relative to split housing 232 and simultaneously rotate pipe shaver 230 using handles 234 about the outside diameter 285 of pipe 244. Upon rotating split housing 232 about pipe 244, cutting edge 66 of cutting blade 56, shaves shaving 246 off of the outside diameter 285 of pipe 244 having a width equivalent to roughly cutting width 242 being the longitudinal distance between step 45 and stop face 238 of shoulder stop 236. In other words, the width of the cut, or the cutting width 240 is controlled by preselecting a off set distance between stop face 238 and step 45 of cutting blade 56. By increasing cutting width 240 as shown in FIG. 8, one increases the width of shaving 246 and hence material is removed more quickly from outside diameter 285 per revolution of split housing 232 about outside diameter 285 of pipe 244. The cutting width 240 is controlled since cut edge 290 of pipe 244 rests against stop face 238 preventing further advancement in the advancement direction 242 passed cut edge 290 of pipe 244. Of course cut edge 290 is continuously moving along the longitudinal length or the advancement direction 242, such that upon each rotation of split housing 232, shaving 246 is taken off the outside diameter of pipe 244. Cut edge 290 is a small step having a height being the difference between the outside diameter 285 being the as is or as received diameter of pipe and the shaved diameter 287. The depth of cut being the difference between the outside diameter 285 and shaved diameter 287 is controlled by the depth of step 45, in other words, the difference in the radial depth of the cutting edge 66 relative to the blade guide 64. Once a desired amount of material is removed from the outside diameter 285 of pipe 244, cutting blade 56 is manually retracted away from the outside diameter and shaved diameter 287 of pipe 244 using lever 68 and applying pressure in the radial direction 65 in a motion 90 on lever end 69 such that cutting blade 56 is retracted away from the cutting surface. Finally, pipe shaver 230 is removed from pipe 244 by loosening thumb nut 302 and thereby splitting open split housing 232, thereby hingeably opening up split housing 232 such that it can be removed away and off of pipe 244.

During the cutting operation, only a small amount of pressure needs to be applied to the pipe and/or the split housing such that the pipe advances in the advancement direction 242 and/or the housing advances in the opposite direction and torque is applied to split housing 232 to rotate it about pipe 244 using handles 244 as already stated.

It should be apparent to persons skilled in the arts that various modifications and adaptation of this structure described above are possible without departure from the spirit of the invention the scope of which defined in the appended claim.

I claim:

1. A pipe shaver for removing a uniform layer of material from the outer diameter of a pipe, the pipe shaver comprises;
   (a) a split housing for releasably mounting around the outside diameter of a pipe, said housing including a longitudinal axis;
   (b) a cutting blade including a mounting means for mounting said blade to said housing, said blade including a cutting edge;
   (c) a means for removably presenting said cutting edge to the outer diameter of a pipe;
   (d) a means for manually controllably moving said cutting edge rotationally and longitudinally along the outer diameter of said pipe for shaving a thin substantially uniform layer of material off the outer diameter of the pipe, and
   (e) wherein said pipe shaver further including a means for controlling the width of the shaving being removed from the outside diameter of a pipe and wherein said width controlling means includes a shoulder stop including a stop face extending around the interior diameter of said housing, wherein a cut edge of a pipe butts up against said stop face.

2. The pipe shaver claimed in claim 1, wherein said mounting means includes a blade guide for positioning a front face of said cuffing blade at an angle theta of not less than 95 degrees relative to the pipe surface.

3. The pipe shaver claimed in claim 1, wherein said mounting means includes a blade guide for positioning a front face of said cutting blade at an angle theta not less than 114 degrees and not more than 120 degrees.

4. The pipe shaver claimed in claim 1, wherein said mounting means includes a blade guide for positioning a front face of said cutting blade off set from said longitudinal axis at a blade position delta not equal to 0 degrees.

5. The pipe shaver claimed in claim 1, wherein said mounting means includes a blade guide for positioning a front face of said cutting blade off set from said longitudinal axis at a blade position delta>5 degrees.

6. The pipe shaver claimed in claim 1, wherein said presenting means includes a means for normally biasing said blade radially inwardly onto the out diameter of a pipe.

7. The pipe shaver claimed in claim 6, wherein said presenting means includes a lifting means for manually urging said blade radially outwardly away from said pipe.

8. The pipe shaver claimed in claim 7, wherein said lifting means includes a pivoting lever connected at one end to said cutting blade, the other end projecting from said housing, such that pivoting said lever about a pivot point biases and lowers said cutting blade in a radial direction.

9. The pipe shaver claimed in claim 1, wherein said presenting means includes a blade housing for slidably receiving said blade therein, such that said blade moves up and down slidably in the radial direction.

10. The pipe shaver claimed in claim 9, wherein said blade housing adapted to receive said housing means therein for biasing said blade radially inwardly.

11. The pipe shaver claimed in claim 1, wherein said width controlling means includes a preselected off set between said blade step and said stop face, such that said offset also referred to as cutting width W controls the width of the shaving removed by the blade.

* * * * *